United States Patent
Yamamoto et al.

(10) Patent No.: US 8,817,291 B2
(45) Date of Patent: Aug. 26, 2014

(54) IMAGE FORMING APPARATUS FOR SELECTIVELY POWERING A USER AUTHENTICATION DEVICE

(75) Inventors: Hiroyuki Yamamoto, Kasugai (JP); Shintaro Sakaguchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 181 days.

(21) Appl. No.: 13/430,162

(22) Filed: Mar. 26, 2012

(65) Prior Publication Data
US 2012/0250068 A1    Oct. 4, 2012

(30) Foreign Application Priority Data

Mar. 29, 2011    (JP) ................................. 2011-072973

(51) Int. Cl.
*G06K 15/00*    (2006.01)
*G06F 21/60*    (2013.01)
*G06F 3/12*    (2006.01)

(52) U.S. Cl.
CPC .......... *G06K 15/4095* (2013.01); *G06F 3/1229* (2013.01); *G06F 3/1279* (2013.01); *G06F 3/1267* (2013.01); *G06F 3/1221* (2013.01); *G06F 21/608* (2013.01); *G06F 3/1222* (2013.01); *G06F 3/1238* (2013.01)
USPC ....... 358/1.14; 358/1.13; 358/1.15; 358/1.16; 713/300; 713/310; 713/320; 713/324

(58) Field of Classification Search
None
See application file for complete search history.

(56) References Cited

U.S. PATENT DOCUMENTS

| | | | |
|---|---|---|---|
| 8,322,609 B2* | 12/2012 | Hashimoto | 235/382 |
| 2003/0053111 A1* | 3/2003 | Endo | 358/1.14 |
| 2008/0259378 A1* | 10/2008 | Suzuki | 358/1.14 |
| 2009/0316178 A1* | 12/2009 | Tanaka | 358/1.14 |
| 2013/0061075 A1* | 3/2013 | Hashimoto | 713/320 |

FOREIGN PATENT DOCUMENTS

| | | |
|---|---|---|
| JP | 2002-356040 A | 12/2002 |
| JP | 2006-164042 A | 6/2006 |
| JP | 2007-172493 A | 7/2007 |
| JP | 2007-267255 A | 10/2007 |
| JP | 2009-160746 A | 7/2009 |
| JP | 2010-000702 A | 1/2010 |
| JP | 2010-245928 A | 10/2010 |

OTHER PUBLICATIONS

Japan Patent Office, Notice of Reasons for Rejection in counterpart Japanese Patent Application No. 2011-072973, mailed Mar. 12, 2013.

* cited by examiner

*Primary Examiner* — Miya J Cato
(74) *Attorney, Agent, or Firm* — Baker Botts L.L.P.

(57) ABSTRACT

An image forming apparatus includes a memory, an image forming device, an authentication device, and a control device. The authentication device performs user authentication. The control device determines whether the stored job requires user authentication. The control device permits the image forming unit to form an image based on the stored job when the job requires user authentication and the authentication device successfully performs user authentication for the job. The control device permits the image forming unit to form an image based on the stored job without user authentication when the job does not require user authentication. The control device selectively supplies power to the authentication device based on whether the stored job requires user authentication.

13 Claims, 11 Drawing Sheets

Fig.3

| USER ID | AUTHENTICATION METHOD | PASSWORD | OUTPUT TIME | PRINT DATA |

Fig.4

| job ID | USER ID | AUTHENTICATION METHOD | PASSWORD | OUTPUT TIME | RECEPTION TIME | I/F INFORMATION | PRINT DATA |
|---|---|---|---|---|---|---|---|
| 1 | User1 | CARD PASSWORD | Pass1 | 2011/1/12 11:12 | 2011/1/12 11:12 | Net | ************ |
| 2 | User2 | CARD | — | 2011/1/12 10:16 | 2011/1/12 10:17 | Net | ************ |
| 3 | User3 | PASSWORD | Pass3 | 2011/1/12 10:29 | 2011/1/12 10:30 | NCU | ************ |
| 4 | User1 | CARD | — | 2011/1/12 10:41 | 2011/1/12 10:41 | NCU | ************ |
| 5 | User4 | — | — | 2011/1/12 11:29 | 2011/1/12 11:30 | Net | 0 |

| | LAST AUTHENTICATION TIME | NUMBER OF USER AUTHENTICATIONS USING CARD | NUMBER OF PASSWORD ENTRIES | TIME FROM REGISTRATION TO AUTHENTICATION (MINIMUM) |
|---|---|---|---|---|
| User1 | 2011/1/12 11:22 | 5 | 5 | 10 MIN. |
| User2 | 2011/1/12 10:22 | 10 | 1 | 5 MIN. |
| User3 | 2011/1/12 11:30 | 0 | 10 | 1 HOUR |
| User4 | 2011/1/13 11:22 | 15 | 0 | 20 MIN. |

Fig.8A

| NUMBER OF USERS OF REGISTERED JOB IS LESS THAN THRESHOLD | Yes | Yes | No | No |
|---|---|---|---|---|
| ELAPSED TIME FROM LAST AUTHENTICATION EXCEEDS THRESHOLD | Yes | No | Yes | No |
| IS POWER TO BE TURNED OFF? | Yes | Yes | Yes | No |

Fig.8B

| KIND OF REGISTERED JOB | PC Print | PC Print | PC Print | PC Print | PC Print | Fax |
|---|---|---|---|---|---|---|
| SECURITY OF JOB | Secure | Secure | Secure | Secure | Public | N/A |
| HIGH POSSIBILITY OF AUTHENTICATION USING CARD | Yes | Yes | Yes | No | N/A | N/A |
| HISTORY OF TIME FROM REGISTRATION TO AUTHENTICATION (MINIMUM) IS LESS THAN OR EQUAL TO THRESHOLD | Yes | No | No | N/A | N/A | N/A |
| NUMBER OF USERS OF REGISTERED JOB IS GREATER THAN OR EQUAL TO THRESHOLD | N/A | Yes | No | N/A | N/A | N/A |
| IS POWER TO BE TURNED ON? | Yes | Yes | No | No | No | No |

Fig.10

IMAGE FORMING APPARATUS FOR SELECTIVELY POWERING A USER AUTHENTICATION DEVICE

CROSS REFERENCE TO RELATED APPLICATION

This application claims priority from Japanese Patent Application No. 2011-072973 filed on Mar. 29, 2011, which is incorporated herein by reference.

BACKGROUND OF THE INVENTION

1. Field of the Invention

The present invention relates generally to image forming apparatus equipped with an authentication unit for user authentication.

2. Description of Related Art

Known image forming apparatus are provided with an authentication unit for authenticating a user when starting a transmitted print job. The known image forming apparatus may be a card reader that reads an IC card, on which a user ID is recorded. Nevertheless, maintaining continuous operation of the known image forming apparatus equipped with an authentication unit results in wasteful power consumption. Thus, a known technology is used to conserve the power consumption of the known image forming apparatus equipped with an authentication unit.

SUMMARY OF THE INVENTION

Although the known technology may conserve power of the known image forming apparatus, the known technology does not conserve power of the authentication unit.

The present invention may provide an image forming apparatus that may reduce the power consumption of an authentication unit while maintaining the convenience of using the authentication unit.

According to an embodiment of the present invention, an image forming apparatus comprising: a memory configured to store a job; an image forming device configured to form an image on a recording medium based on the stored job; an authentication device configured to perform user authentication; and a control device configured to: determine whether the stored job requires user authentication; permit the image forming unit to form an image based on the stored job when the job requires user authentication and the authentication device successfully performs user authentication for the job; permit the image forming unit to form an image based on the stored job without user authentication when the job does not require user authentication; and selectively supply power to the authentication device based on whether the stored job requires user authentication.

Other objects, features, and advantages of an embodiment of the invention will be apparent to persons of ordinary skill in the art from the following description of an embodiment with reference to the accompanying drawings.

BRIEF DESCRIPTION OF THE DRAWINGS

For a more complete understanding of the present invention, needs satisfied thereby, and the objects features, and advantages thereof, reference now is made to the following descriptions taken in connection with the accompanying drawings.

DETAILED DESCRIPTION OF EMBODIMENTS OF THE INVENTION

Embodiments of the invention now are described in detail with reference to the accompanying drawings; like reference numerals are used for corresponding parts in the various drawings.

(1) Configuration of Printer

Figure 1:
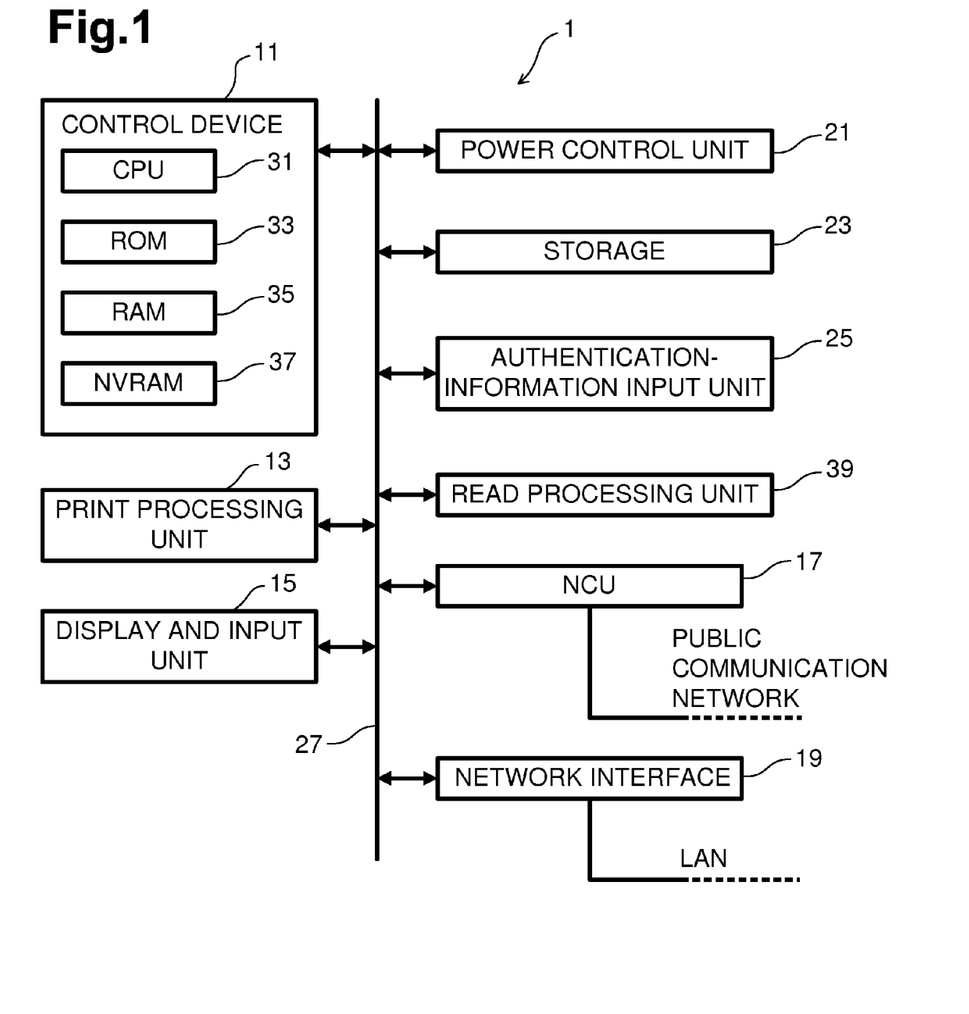
FIG. 1 is a diagram depicting a configuration of a printer according to an embodiment of the present invention.

Referring to FIG. 1, the printer 1 may be an apparatus having a network printer function, a facsimile function, and the like. The printer 1 may include a control device 11, a print processing unit 13, a display and input unit 15, a network control unit (NCU) 17, a network interface 19, a power control unit 21, a storage 23, an authentication-information input unit 25, and a read processing unit 39.

The control device 11 may include a CPU 31; a ROM 33, in which programs to be executed by the CPU 31 are stored; a RAM 35 that is used as a work area when the programs are executed by the CPU 31; and an NVRAM 37, which is a nonvolatile memory, e.g., an electrically rewritable flush memory; and an EEPROM. The control device 11 may implement the functions of the printer 1 by controlling the printer 1 to execute the programs.

The control device 11 and the various components of the printer 1 may be electrically connected via a bus 27, as indicated by the straight line in FIG. 1.

Figure 7:
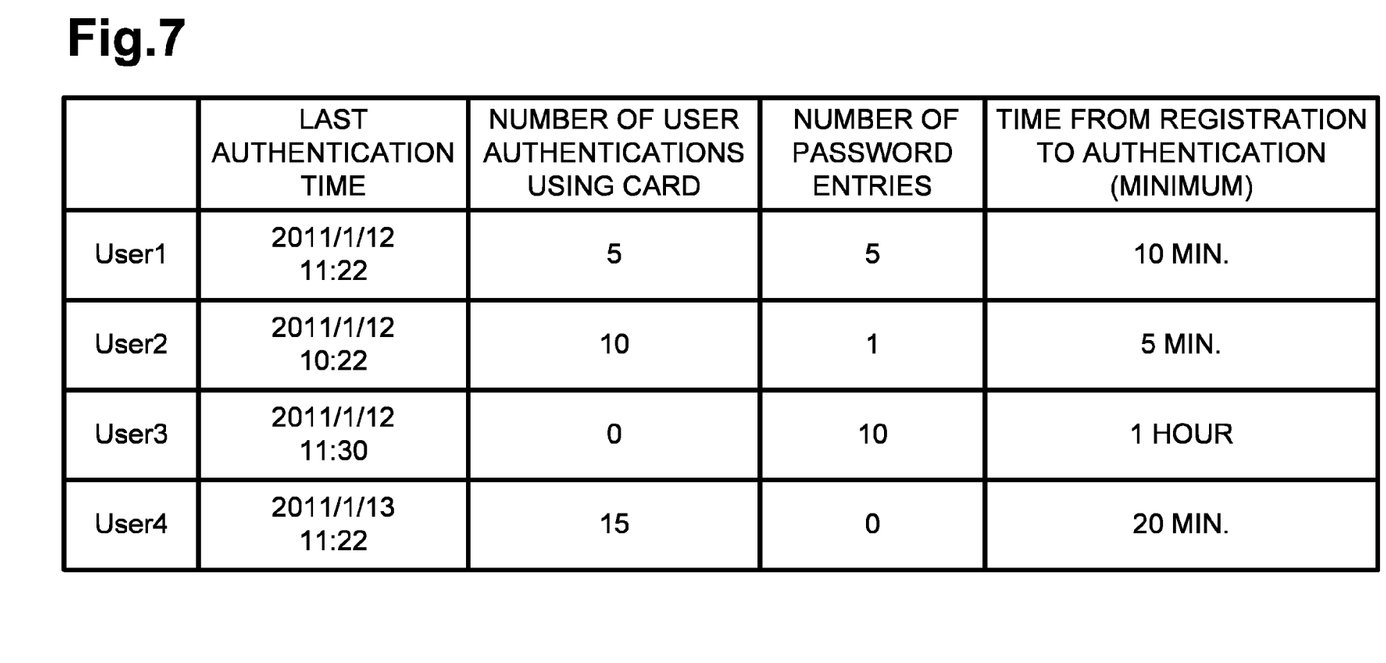
FIG. 7 is a diagram depicting a user management table according to an embodiment of the present invention.

The control device 11 may include a real-time clock, so that the present time may be indicated. The control device 11 may store the time that the last user authentication is performed by the authentication-information input unit 25. The NVRAM 37 may store a user management table, as shown in FIG. 7.

The control device 11 may control the print processing unit 13 to feed a record medium, e.g., a paper, from a paper feed tray and form an image on the recording medium based on print job data. If the job requires user authentication or password entry, the control device 11 may permit the print processing unit 13 to perform printing based on the job when the user authentication was performed by the authentication-information input unit 25 or when a password is input to the display and input unit 15. If the job requires no user authentication or password input, printing may be permitted without performing the user authentication or password entry.

The display and input unit 15 may comprise a liquid crystal display and a touch panel disposed on the display surface of the liquid crystal display. The display and input unit 15 may display various information in accordance with the output of the control device 11, and operation information about the printer 1. The display and input unit 15 may receive operation information input from the user through a touch panel operation and may input the operation information to the control device 11.

The NCU 17 may connect the printer 1 to a public communication network, and may transmit and receive facsimile data by connecting to an external facsimile transmitter-receiver through the public communication network.

The network interface 19 may be an interface for the printer 1 to allow two-way communication between a plurality of computer systems and the printer 1 via a LAN. The network interface 19 may receive data addressed to the printer 1 via the LAN and may input the data to the control device 11.

Figure 2:
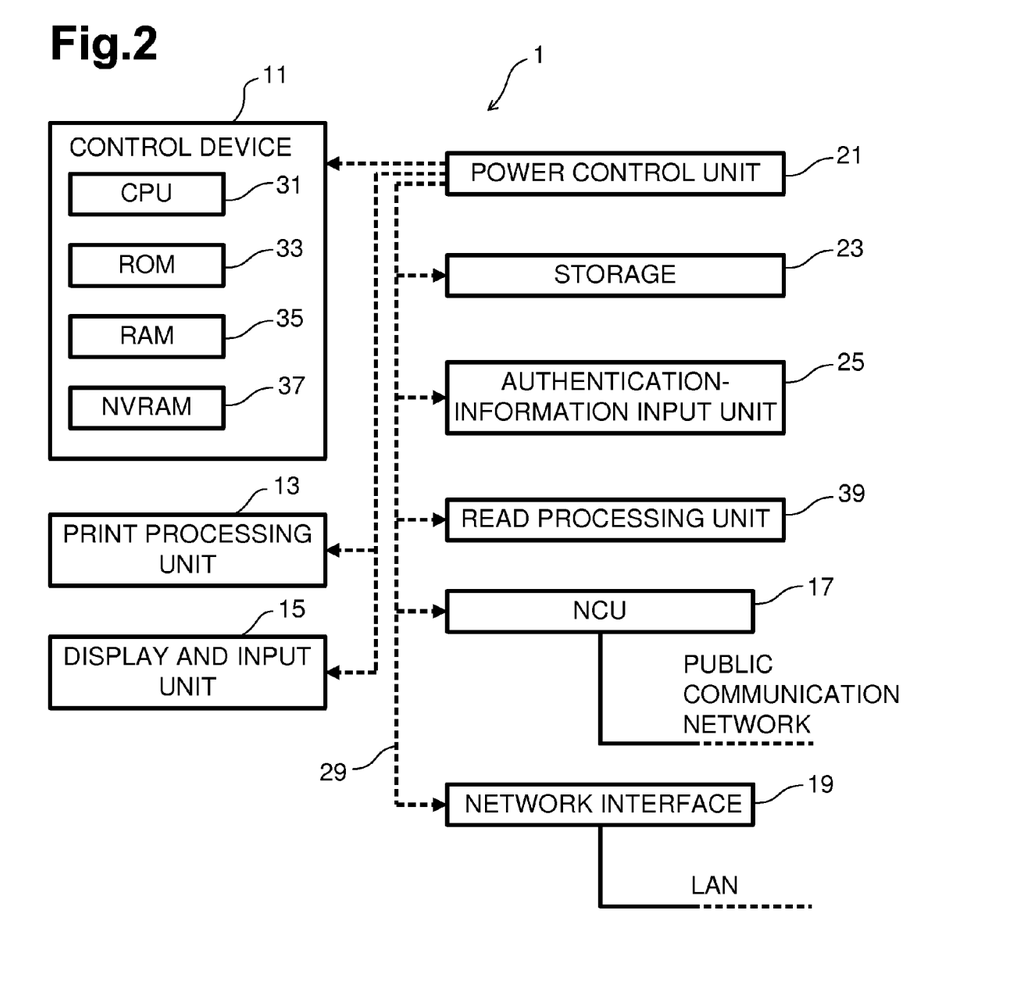
FIG. 2 is a diagram depicting a configuration of power supplied from a power control unit according to an embodiment of the present invention.

As shown in FIG. 2, the power control unit 21 may supply power to the components of the printer 1 via a power control line 29, as indicated by a broken line. The power control unit 21 may be configured to switch between a normal mode, in which electric power is supplied, so that the authentication-information input unit 25 may perform user authentication, and a power-saving mode, in which supply of electric power to the authentication-information input unit 25 may be stopped, based on the control of the control device 11.

The power control unit 21 may begin to supply power to the print processing unit 13 when printing process begins and may stop the power supply to the print processing unit 13 after a predetermined time has lapsed since the end of printing process. The power control unit 21 may begin to supply power to the read processing unit 39 when a reading process starts and may stop supplying power to the read processing unit 39 after a predetermined time has elapsed since the end of the reading process.

The power control unit 21 may switch power supplied to each of the individual components of the printer 1 at individual timings set for the corresponding components.

The storage 23 may be a storage unit, e.g., a hard disk drive, which stores or reads job information received via the NCU 17 or the network interface 19 in accordance with the control of the control device 11. The job stored in the storage 23 may be referred to as a registered job. The registered job may be deleted from the storage 23 after a printing process based on the job is executed.

Figure 3:
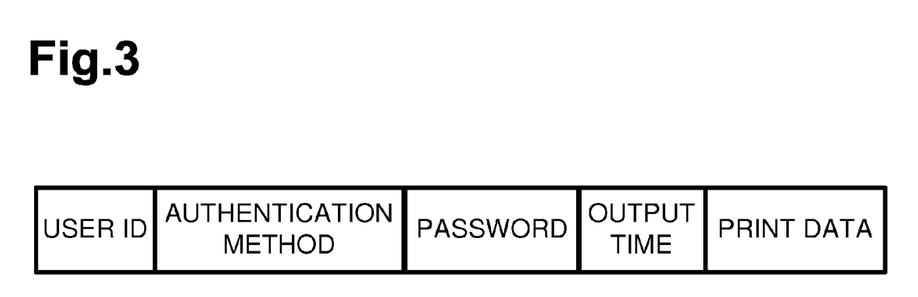
FIG. 3 is a diagram depicting job data according to an embodiment of the present invention.

As shown in FIG. 3, a job transmitted to the printer 1 may be data including user ID, authentication method, password, output time, at which the job is output to the printer 1, and print data for forming an image.

Figure 4:
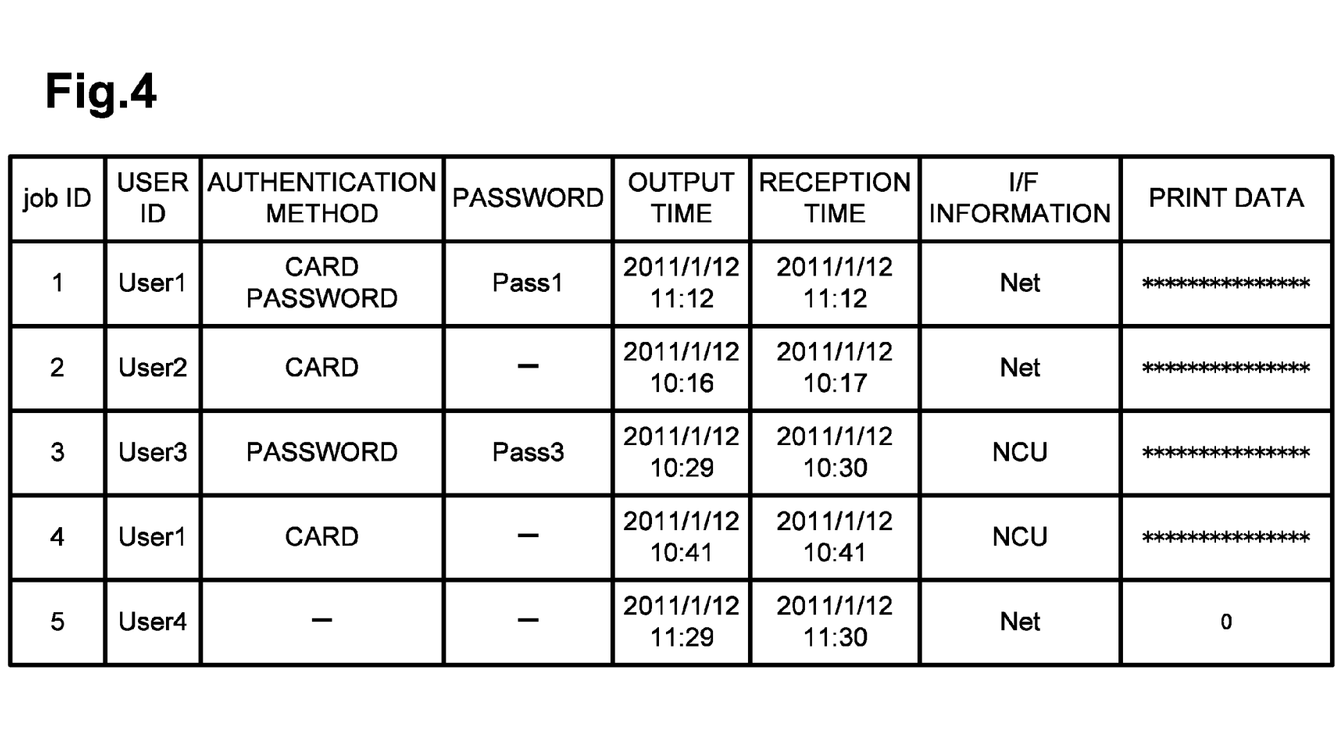
FIG. 4 is a diagram depicting job information stored in a storage according to an embodiment of the present invention.

The storage 23 may store job information, as shown in FIG. 4. The job information to be stored may include Job ID, e.g., an identification number assigned to each job, a time at which the printer 1 received the job, and I/F information indicating whether an interface that has received the job is the network interface 19, e.g., "Net," or the NCU 17.

The authentication method may include two types: (1) card authentication, in which user authentication is performed using an IC card, and (2) password authentication, in which a password is input to the display and input unit 15.

A job that requires card authentication may be a Secure Print job that requires user authentication using an IC card for permitting printing or a Secure FAX Job that requires authentication using an IC card for permitting printing of a fax received. On the other hand, a job corresponding to the password authentication may be a job that requires an input of a password to the display and input unit 15 for permitting printing. A job corresponding to both of the card authentication and the password authentication may be permitted to be printed by using either of the card authentication method or the password authentication method.

The authentication-information input unit 25 may be equipped with a card reader for reading information stored in an ID card carried by a user. Examples of the ID card carried by a user may include a contactless IC tag, a magnetic card, or the like, which store a user ID for authenticating the user.

The authentication-information input unit 25 may read a user ID recorded on an ID card inserted into or brought into contact or proximity with a card reader and may input the read user ID to the control device 11. The control device 11 may perform user authentication using the user ID transmitted from the authentication-information input unit 25. A registered job having the same user ID as that of the authenticated user may be extracted from registered jobs stored in the storage 23, and a printing process based on the registered job may be executed by the print processing unit 13.

When the power control unit 21 is in a normal mode and when power is supplied from the power control unit 21, the authentication-information input unit 25 may be in a power-on condition, in which user authentication may be performed, e.g., an active mode. When the power control unit 21 is in a power-saving mode and power supply is stopped, the authentication-information input unit 25 may enter a power-off condition, in which user authentication may not be performed, e.g., a power-saving mode.

The authentication-information input unit 25 may include a switch for manually turning on power. When the switch is pressed, the power control unit 21 may enter the normal mode, in which the authentication-information input unit 25 is supplied with power to allow user authentication.

The control device 11 may control the read processing unit 39 to generate image data by reading documents. The NCU 17 may transmit the generated image data as a FAX job to a destination via a public line. Alternatively, the print processing unit 13 may print the generated image data may be printed on a paper.

Figure 5:
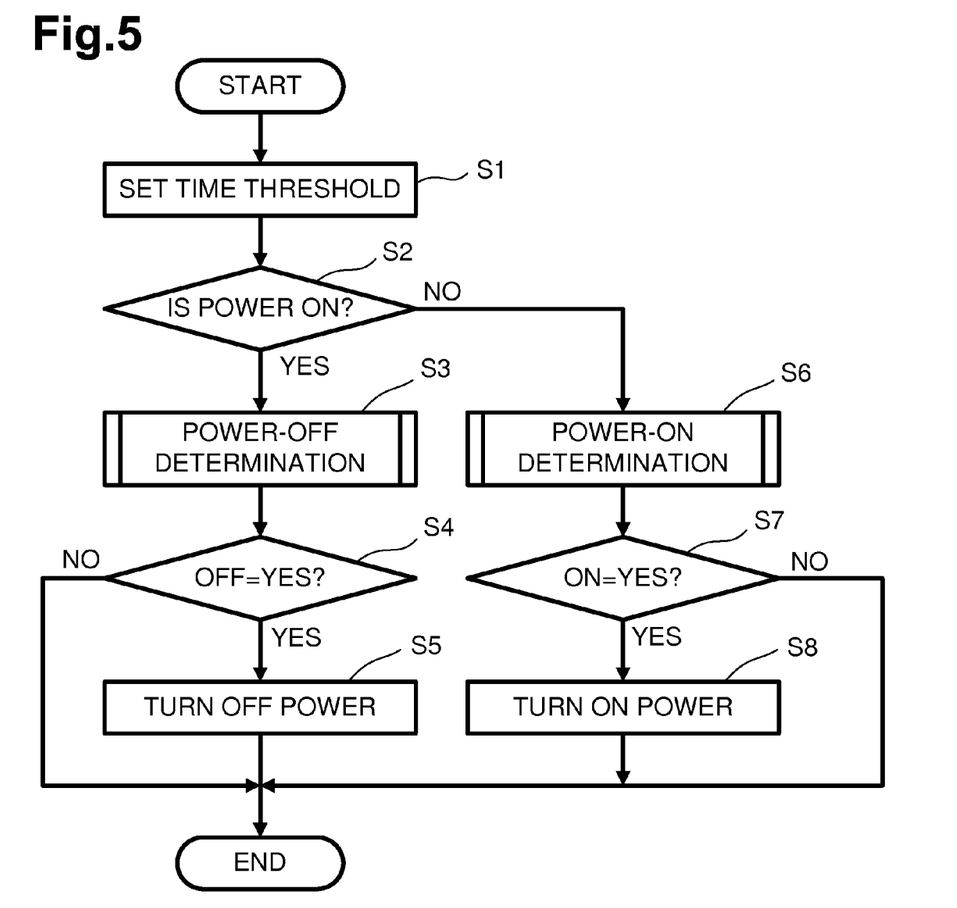
FIG. 5 is a flowchart depicting a power control process according to an embodiment of the present invention.

(2) Power Control of Authentication-Information Input Unit
  (a) Power-Supply Control Process Referring to FIG. 5, a power control process may be executed at one of the following timings: (1) when a new job is stored in the storage 23, e.g., memory; (2) when a registered job is deleted, (3) when a print instruction is given; and (4) when a predetermined time has elapsed since the power control process is executed.

A registered job may be deleted when the cancellation of the job sent from a computer system connected to the printer 1 via a LAN is received, or after the registered job has been performed. A print instruction may be given when a printing-process control signal is transmitted from the control device 11 to the print processing unit 13 after user authentication.

In the power control process, first, a time threshold may be set at step S1. Specifically, jobs that use card authentication method may be extracted from the registered jobs stored in the storage 23, as shown in FIG. 4, and the number of users corresponding to the jobs may be counted. As shown in FIG. 4, Job IDs 1, 2, and 4 require user authentication using cards. Because the jobs having Job IDs 1 and 4 are associated with the same user, e.g., User 1, the number of users corresponding to the jobs that use card authentication method may be two. The time threshold may be determined based on the number of users counted. The time threshold may be 30 seconds when the number of users is one and may be increased by 20 seconds for every additional user. Accordingly, for the job information, as shown in FIG. 4, the time threshold may be 50 seconds for two users that are associated with jobs that use card authentication.

Next, it may be determined whether the authentication-information input unit 25 is in a power-on condition at step S2. If the authentication-information input unit 25 is in a power-on condition, e.g., YES at step S2, a power-off determination process may be executed at step S3.

Next, the power-off determination process may determine whether the power is to be turned off at step S3. If it is determined in step S3 that the power is to be turned off, e.g., YES at step S4, the power-off determination process may proceed to step S5.

At step S5, the power of the authentication-information input unit 25 may be turned off, e.g., power supply from the power control unit 21 may be stopped in a power-off condition, and the power-off determination process may end.

On the other hand, if it is determined in step S3 that the power is not to be turned off, e.g., NO at step S4, the process may end while maintaining the power-on condition.

If it is determined in step S2 that the authentication-information input unit 25 is not in a power-on condition, e.g., NO at step S2, a power-on determination process may be executed at step S6.

At step S6, the power-on determination process may determine whether the power is to be turned on. If it is determined in step S6 that the power is to be turned on, e.g., YES at step S7, the power-on determination process may proceed to step S8.

At step S8, the power of the authentication-information input unit 25 may be turned on, e.g., power supply from the power control unit 21 may be started in a power-on condition, and the power-on determination process may end.

On the other hand, if it is determined in step S6 that the power is not to be turned on, e.g., NO at step S7, the process may end while maintaining the power-off condition.

(b) Power-Off Determination Process

Figure 6:
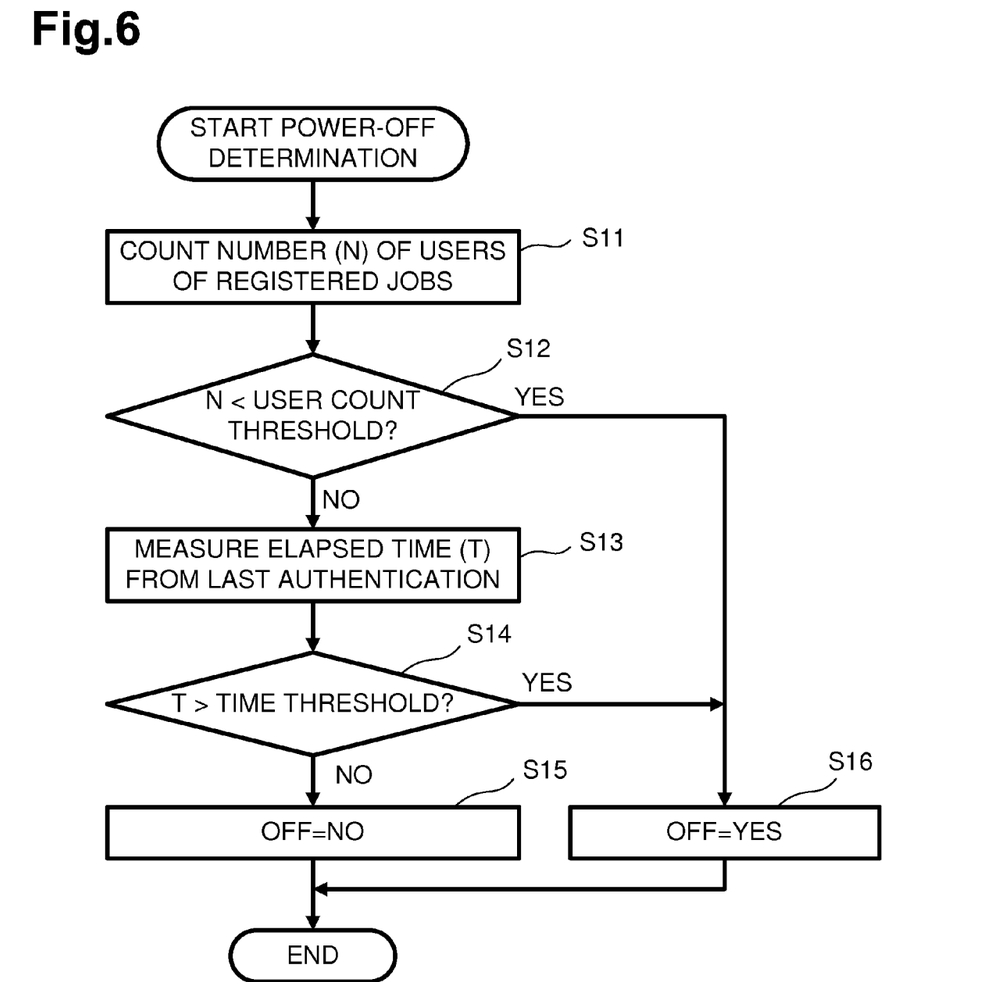
FIG. 6 is a flowchart depicting a power-off determination process according to an embodiment of the present invention.

Referring to FIG. 6, the power-off determination process may be executed in step S3 of the power control process. The power-off determination process may be executed when the authentication-information input unit 25 is in a power-on condition.

In the power-off determination process, the number of users of registered jobs may be counted at step S11. Specifically, in step S11, jobs that require user authentication using cards may be extracted from the registered jobs stored in the storage 23, as shown in FIG. 4, and the number of users corresponding to the jobs may be counted.

Next, whether the number of users counted in S11 is less than a predetermined user count threshold may be determined in step S12. If the number of users is less than the user count threshold, there may be a reduced possibility that user authentication is executed; in contrast, if the number of users is greater than or equal to the user count threshold, there may be an increased possibility that user authentication is executed.

In step S12, if the number of users counted in step S11 is less than the predetermined user count threshold, e.g., YES at step S12, the power-off determination process may proceed to step S16. If the number of users is not less than the predetermined user count threshold, e.g., NO at step S12, an elapsed time from the last authentication may be measured at step S13. The last authentication may be the latest user authentication performed by the authentication-information input unit 25. Specifically, a user management table, as shown in FIG. 7, may be checked. The user management table may store in advance the last authentication time, the number of user authentications using an IC card, the number of password entries, and the minimum time between when the job is stored in the storage 23 and when the user is authenticated using an IC card, for the individual users registered in the printer 1. The information may be updated each time user authentication using an IC card or password entry is performed after a print request is issued by the user. An elapsed time between the latest time of all the last authentication time stored in the user management table and the present time may then be measured with reference to the history.

Next, it may be determined whether the elapsed time since the latest authentication exceeds the time threshold at step S14. The time threshold may be the time set in step S1 and may increase when a number of users increases. If the elapsed time exceeds the predetermined time threshold, e.g., YES at step S14, the process may proceed to step S16. If the elapsed time has not exceeded the predetermined time threshold, e.g., NO at step S14, it may be determined that the power is not to be turned off, e.g., OFF=NO at step S15, and the power-off determination process may terminate and the process may return to the power control process.

In step S16, the power may be determined to be turned off, e.g., OFF=YES, and the power-off determination process may terminate and the process may return to the power control process.

Figure 8A:
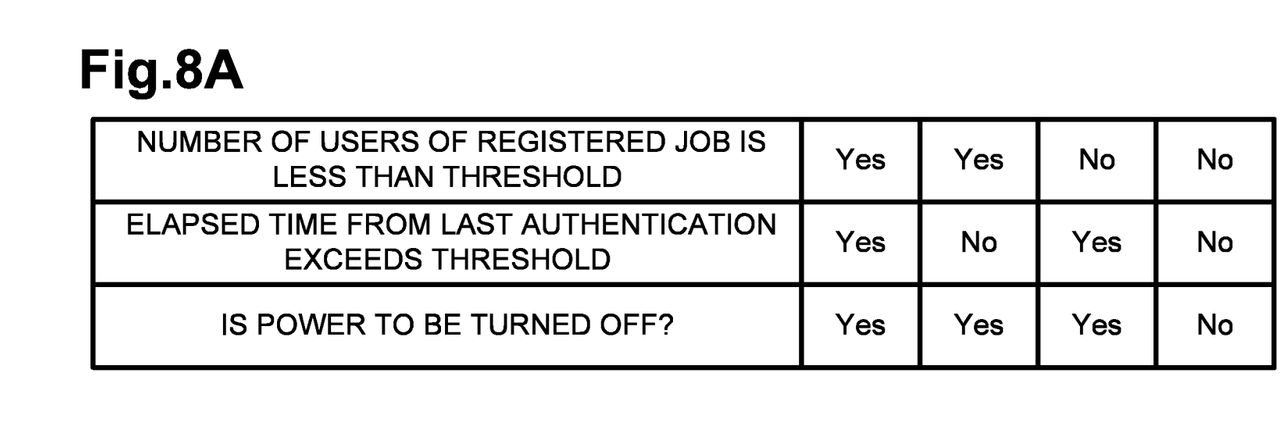
FIG. 8A is a table indicating conditions for turning off power according to an embodiment of the present invention.

As described above, it may be determined that the power is to be turned off provided that at least one of two conditions is satisfied: (1) the number of users corresponding to registered jobs is less than a predetermined user count threshold; and (2) the time elapsed since the last authentication exceeds a predetermined time threshold. FIG. 8A depicts a table listing conditions for determining to turn off the power. In step S4 of FIG. 5, whether to turn off the power may be determined based on the table of FIG. 8A.

(c) Power-On Determination Process

Figure 9:
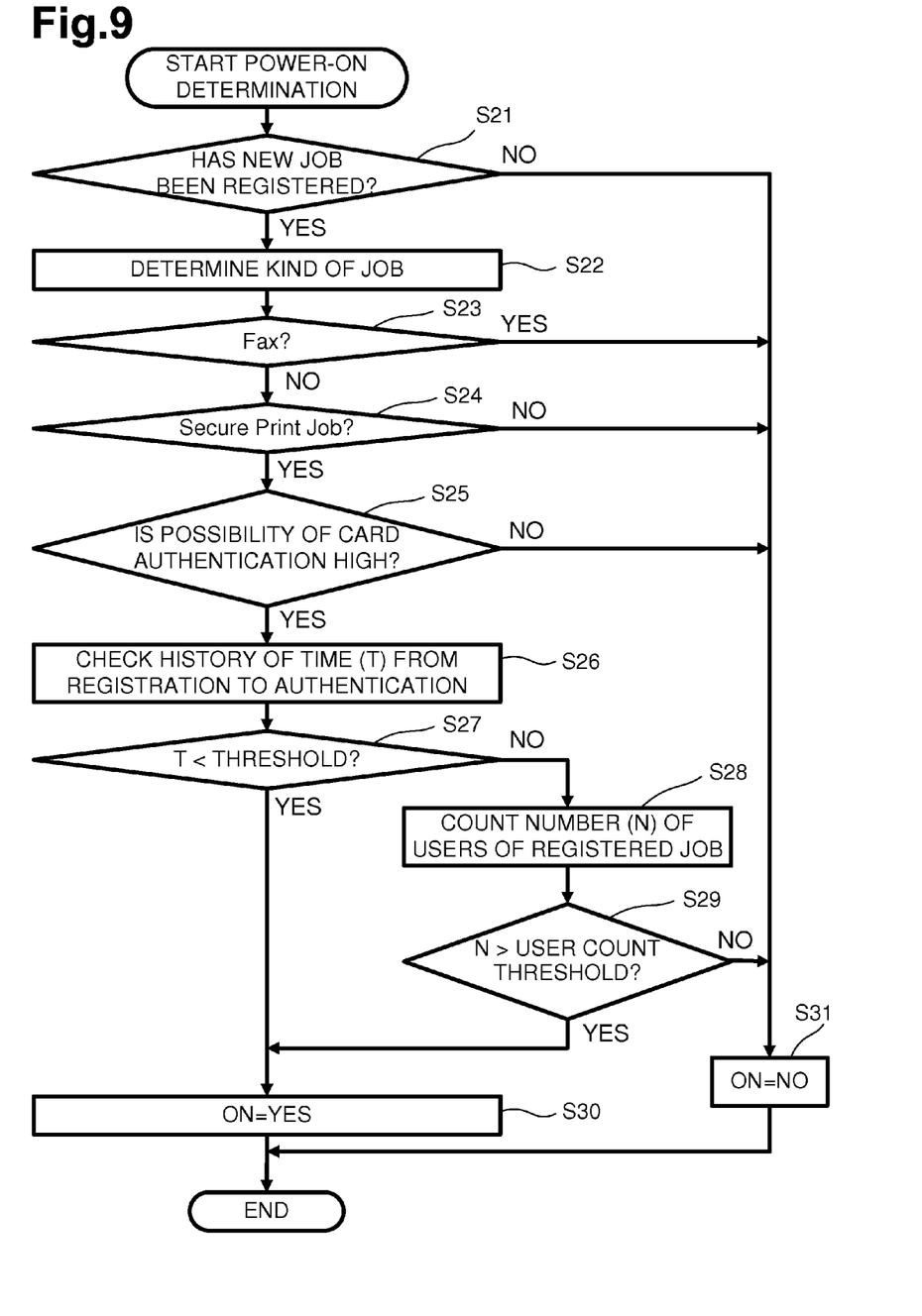
FIG. 9 is a flowchart depicting power-on determination process according to an embodiment of the present invention.

Referring to FIG. 9, the power-on determination process may be executed in step S6 of the power control process. The power-on determination process may be executed when the authentication-information input unit 25 is in a power-off condition.

In the power-on determination process, it may be determined whether the power control process, which is a precondition of this process, is triggered by storage of a new job in the storage 23, e.g., a new job registration, in step S21. If no new job is registered, e.g., NO at step S21, the power-on determination process may proceed to step S31.

In step S21, if the power control process is triggered by new job registration, e.g., YES at step S21, the kind of the registered job may be determined at step S22. Information of the new registered job, e.g., new job, stored in the storage 23, as shown in FIG. 4, may be checked.

It may be determined from I/F information whether the new job is transmitted via the network interface 19 or the NCU 17, e.g., whether the new job is transmitted from a computer system on a network or a FAX job. Further, it may be determined from information on the authentication method whether the job corresponds to card authentication or password authentication, e.g., whether user authentication or password entry is required to permit printing of the job.

Next, it may be determined whether the new job is a FAX job at step S23. If the new job is a FAX job, e.g., YES at step S23, the process may proceed to step S31. On the other hand, if the new job is not a FAX job, e.g., NO at step S23, the power-on determination process may proceed to step S24.

It then may be determined whether the new job is a Secure Print job that requires user authentication for printing at step S24. If the new job is not a Secure Print job, e.g., NO at step S24, the power-on determination process may proceed to step S31. On the other hand, if the new job is a Secure Print job, e.g., YES at step S24, the power-on determination process may proceed to step S25.

Subsequently, it may be determined whether the possibility of card authentication is greater than or equal to a predetermined threshold at step S25. It may be determined which one of user authentication using an IC card and user authentication using password entry has a greater possibility of being used by the user who has issued a new-job print request. Therefore, if the new job corresponds only to user authentication using an IC card, e.g., the registered job with a Job ID 2 in FIG. 4, there may be no possibility of password entry being used, and thus, it may be determined that the possibility of card authentication is greater than or equal to the predetermined threshold, e.g., YES at step S25, and the power-on determination process may proceed to step S26.

When the new job corresponds to both of user authentication and password entry, the user management table shown in FIG. 7 may be checked.

The percentage of user authentication using an IC card may be calculated from the total sum of the number of user authentications using an IC card and the number of password entries. If user authentication using an IC card is performed at a percentage greater than or equal to a predetermined threshold, e.g., 70%, it may be determined that the possibility of card authentication is high, e.g., YES at step S25, and the power-on determination process may proceed to step S26. If user authentication using an IC card is performed at a percentage less than the predetermined threshold, it may be determined that the possibility of card authentication is low, e.g., NO at step S25, and the process power-on determination may proceed to step S31.

For example, if the user of the new job is User 2 or 4 in FIG. 7, it may be determined that the possibility is greater than or equal to the predetermined threshold. If the user of the new job is User 1 or 3 in FIG. 7, it may be determined that the possibility is less than the predetermined threshold.

Subsequently, the history of the time between registration and authentication may be checked in step S26. The "minimum time from registration to authentication" of the user on the user management table may be checked. This time may be used for determining whether there is an increased probability that the user performs user authentication at an early stage, which is the minimum time in this embodiment. In another embodiment, instead of the minimum time, another history, such as the mean time between registration and authentication, may be used to determine whether the user performs user authentication at an early stage.

It then may be determined whether the minimum time checked in step S26 is less than a predetermined threshold at step S27. If the minimum time is less than the predetermined threshold, e.g., YES at step S27, the power-on determination process may proceed to step S30.

If the minimum time checked in step S26 is not less than the predetermined threshold, e.g., NO at step S27, the number of users of registered jobs may be counted at step S28. Specifically, jobs that require user authentication using IC cards may be extracted from the registered jobs stored in the storage 23, as shown in FIG. 4, and the number of users corresponding to the jobs may be counted.

Afterwards, it may be determined whether the number of users counted in step S28 exceeds a predetermined user count threshold at step S29. The user count threshold may be the same as the threshold used in step S12. In another embodiment, the user count threshold may be different from the threshold used in step S12.

In step S29, if the number of users exceeds the user count threshold, e.g., YES at step S29, the power-on determination process may proceed to step S30. If the number of users does not exceed the user count threshold, e.g., NO at step S29, the power-on determination process may proceed to S31.

In step S30, it may be determined that the power is to be turned on, e.g., ON=YES, and the power-on determination process may terminate and may return to the power control process.

In step S31, it may be determined that the power is not to be turned on, e.g., ON=NO, and the power-on determination process may terminate and may return to the power control process.

Figure 8B:
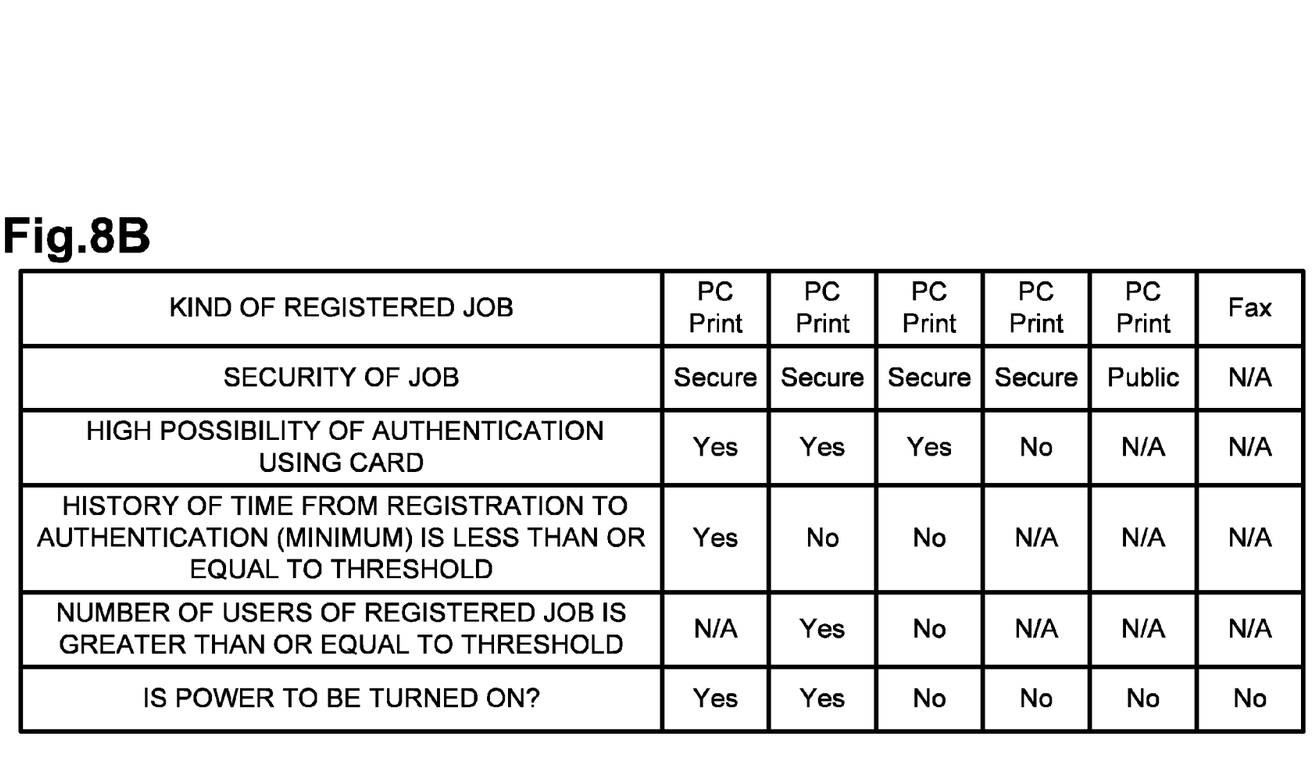
FIG. 8B is a table indicating conditions for turning on power according to an embodiment of the present invention.

FIG. 8B depicts a table listing conditions for determining to turn on the power in the power-on determination process. In step S7 of FIG. 5, whether to turn on the power may be determined based on the table of FIG. 8B.

(3) Advantages

Because the printer 1 may control whether to supply power to the authentication-information input unit 25 based on whether registered jobs require user authentication, improvement in both the convenience of user authentication and the reduction in power consumption may be achieved.

Specifically, the authentication-information input unit 25 may be turned on when there is an increased probability of user authentication. When an elapsed time from the last use of the authentication-information input unit 25 is less than a set time threshold, when a new job is a Secure Print job that requires user authentication, when there is an increased probability that the user performs card authentication, and when the number of users corresponding to registered jobs that require user authentication is increased; therefore, this may eliminate the need for the user to perform an input operation for supplying power to the authentication-information input unit 25 or to wait for a starting time until the authentication-information input unit 25 begins to perform user authentication, thus improving the convenience to the user.

When there is a reduced probability of user authentication, the authentication-information input unit 25 may be turned off to reduce power waste.

The time threshold may increase when a number of users corresponding to jobs that require user authentication increases. Because the possibility that the authentication-information input unit 25 is used may increase when the number of users corresponding to jobs that require user authentication increases, power may be supplied based on this possibility.

(4) Power Control of Authentication-Information Input Unit

Figure 10:
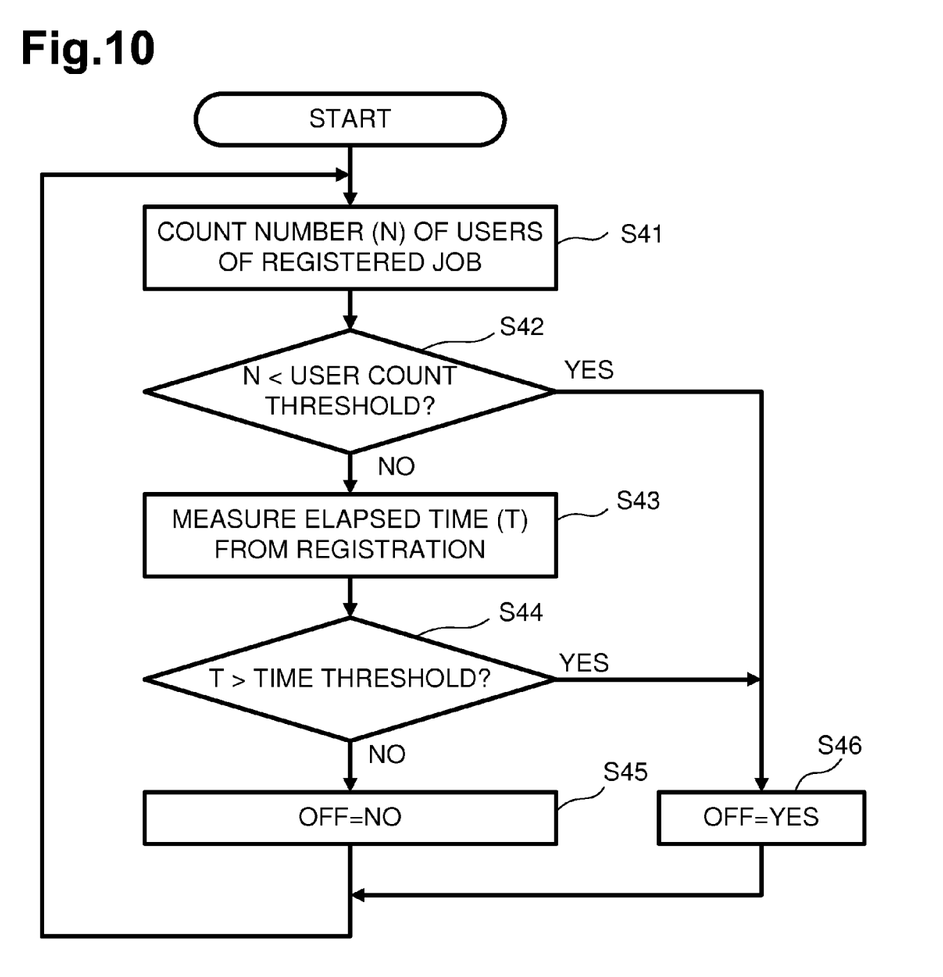
FIG. 10 is a flowchart depicting a power control process according to an embodiment of the present invention.

Characteristic processes may be executed by the control device 11 of the printer 1. Referring to FIG. 10, the control device 11 may execute a power control process when the printer 1 is ready for receiving a job.

In the power control process, the number of users of registered jobs may be counted at step S41. Specifically, jobs that require user authentication using cards may be extracted from registered jobs stored in the storage 23, as shown in FIG. 4, and the number of users corresponding to the jobs may be counted.

It then may be determined whether the number of users counted in step S41 is less than a predetermined user count threshold at step S42. If the number of users counted in step S41 is less than the predetermined user count threshold, e.g., YES at step S42, the process may proceed to step S46. On the other hand, if the number of users counted in step S41 is not less than the predetermined user count threshold, e.g., NO at step S42, the power control process may proceed to step S43.

In step S43, an elapsed time from the last registration of job in the storage 23 may be measured.

Subsequently, it may be determined whether the elapsed time from the last job registration exceeds a predetermined time threshold at step S44. If the elapsed time exceeds the predetermined time threshold, e.g., YES at step S44, the power control process may proceed to step S46. If the elapsed time does not exceed the predetermined time threshold, e.g., NO at step S44, power from the power control unit 21 may be supplied to the authentication-information input unit 25 at step S45. If power has already been supplied, the supply may be maintained. Thereafter, the power control process may proceed to step S41.

In step S46, the power supplied from the power control unit 21 to the authentication-information input unit 25 may be stopped. If the power supply has already been stopped, the stoppage may be maintained. Thereafter, the power control process may proceed to step S41.

The printer 1 may supply power to the authentication-information input unit 25 when the number of users corresponding to jobs that require user authentication is greater than or equal to a predetermined threshold. Because the probability that the authentication-information input unit 25 is used may increase with an increasing number of users, power may be supplied depending on the probability. The threshold may be a fixed value. In another embodiment, the threshold may be varied depending on the situation. For example, the threshold may be varied depending on the time and the day of week. In another embodiment, the threshold may be set to zero, so that power is supplied to the authentication-information input unit 25 even if there is only one registered job that requires user authentication.

Because power supply may be stopped when the elapsed time after the last job is stored in the storage 23 exceeds a predetermined threshold, if a print request to the printer 1, e.g., transmission of a job, is not issued for an extensive amount of time, the operation of the authentication-information input unit 25 may be suppressed. Because there may be a reduced probability of user authentication when a print request is not issued for an extensive amount of time, power may be conserved.

The control device 11 may control the power to be supplied from the power control unit 21 to the authentication-information input unit 25, so that the authentication-information input unit 25 is in one of a power-on condition and a power-off condition. In another embodiment, the control device 11 may transmit a control signal to the authentication-information input unit 25 to switch the authentication-information input unit 25 between an active mode in which authentication is possible and a power-saving mode in which authentication is impossible.

The power is not supplied in a power-saving mode. In another embodiment, the amount of power supply may be reduced in a power-saving mode.

The determination of whether to turn on the authentication-information input unit 25 may be made depending on a combination of conditions not limited to that described in the embodiments.

For example, although the power may not be turned on when the new job is a FAX job in step S23 of FIG. 9. In another embodiment, the process of step S23 may be skipped and the process may proceed to step S24 if authentication is needed even when the new job is a FAX job.

The present invention may be configured, such that a job, which is permitted to be printed through password entry, is not brought into a power-on condition even if printing through user authentication is possible.

While the present invention has been described in connection with various example structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. An image forming apparatus comprising:
   a memory configured to store a job;
   an image forming device configured to form an image on a recording medium based on the job;
   an authentication device configured to perform user authentication; and
   a control device configured to:
      determine whether the job requires user authentication;
      control the image forming unit to form an image based on the job when the job requires user authentication and the authentication device successfully performs user authentication for the job;
      control the image forming unit to form an image based on the job without user authentication when the job does not require user authentication; and
      supply power to the authentication device in response to determining that the job requires user authentication,
      wherein the control device is configured to reduce power supplied to the authentication device based on a determination that the job does not require user authentication, and
      wherein the control device is configured to reduce power supplied to the authentication device when the job is implemented by a facsimile function.

2. The image forming apparatus according to claim 1, wherein the authentication device is configured to read user information stored in a card.

3. The image forming apparatus according to claim 1, wherein the control device is configured to turn off power supplied to the authentication device when the job does not require user authentication.

4. The image forming apparatus according to claim 1, wherein the control device is configured to:
   count a time elapsed since a last user authentication was performed; and
   reduce power supplied to the authentication device when the elapsed time is greater than a predetermined period.

5. The image forming apparatus according to claim 1, wherein the control device is configured to:
   supply power to the authentication device when a new job that requires user authentication is stored in the memory; and
   reduce power supplied to the authentication device when a new job that does not require user authentication is stored in the memory.

6. The image forming apparatus according to claim 5, wherein the control device is configured to:
   count a time elapsed since a last job is stored in the memory;
   supply power to the authentication device when the elapsed time is less than or equal to a predetermined threshold; and
   reduce power supplied to the authentication device when the elapsed time is greater than the predetermined threshold.

7. The image forming apparatus according to claim 1, further comprising:

an input device configured to input a password of the job,
wherein the control device is configured to reduce power supplied to the authentication device when the job does not require user authentication using the authentication device and when the job requires the password input.

8. The image forming apparatus according to claim 1, further comprising:
a power supply device configured to supply power to the authentication unit,
wherein the control device is configured to set an operation mode of the power supply unit to one of a power-supplying mode and a power-saving mode, in which the amount of power supply is less than that in the power-supplying mode,
wherein the power supply device is configured to supply power to the authentication device in the power-supplying mode and reduce power supplied to the authentication device in the power-saving mode.

9. The image forming apparatus according to claim 1, wherein the control unit is configured to transmit a control signal that controls a power supply of the authentication unit, and
wherein the authentication unit is configured to be set in one of an active mode and a power-saving mode, in which power consumption is less than that in the active mode, based on the control signal.

10. An image forming apparatus comprising:
a memory configured to store a job;
an image forming device configured to form an image on a recording medium based on the job;
an authentication device configured to perform first user authentication;
an input device configured to perform second user authentication, the second user authentication is user authentication by inputting a password of the job; and
a control device configured to:
determine whether the job requires at least one of the first user authentication and the second user authentication;
control the image forming unit to form an image based on the job when the job requires at least one of the first user authentication and the second user authentication, and the authentication device successfully performs at least one of the first user authentication and the second user authentication for the job;
control the image forming unit to form an image based on the job without any user authentication when the job does not require at least one of the first user authentication and the second user authentication;
calculate a ratio of a number of the first user authentication to a number of the second user authentication when the job requires one of the first user authentication and the second user authentication, the number of the first user authentication and the number of the second user authentication correspond to a user; and
supply power to the authentication device when the ratio is greater than or equal to a predetermined threshold.

11. An image forming apparatus comprising:
a memory configured to store a job;
an image forming device configured to form an image on a recording medium based on the job;
an authentication device configured to perform user authentication; and
a control device configured to:
determine whether the job requires user authentication;
control the image forming unit to form an image based on the job when the job requires user authentication and the authentication device successfully performs user authentication for the job;
control the image forming unit to form an image based on the job without user authentication when the job does not require user authentication;
selectively supply power to the authentication device based on a determination that the job requires user authentication;
acquire user information corresponding to the job;
count the number of users corresponding to the job that require user authentication; and
supply power to the authentication device when the number of users counted is greater than or equal to a predetermined threshold number.

12. The image forming apparatus according to claim 11, wherein the control device is configured to:
count a time elapsed since a last user authentication was performed; and
reduce power supplied to the authentication device when the elapsed time is greater than a predetermined period.

13. The image forming apparatus according to claim 12, wherein the control device is configured to set the predetermined period based on the number of users counted.

* * * * *